(12) United States Patent
Rowe et al.

(10) Patent No.: US 8,312,364 B2
(45) Date of Patent: *Nov. 13, 2012

(54) SOCIAL WEBSITE DOMAIN REGISTRATION ANNOUNCEMENT AND SEARCH ENGINE FEED

(75) Inventors: Tiffany Rowe, Chandler, AZ (US); Sean Hayes, Phoenix, AZ (US); Patrick Dolan, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/561,408

(22) Filed: Sep. 17, 2009

(65) Prior Publication Data

US 2011/0066930 A1    Mar. 17, 2011

(51) Int. Cl.
*G06F 17/00* (2006.01)

(52) U.S. Cl. .................................................. 715/205

(58) Field of Classification Search .................. 715/205
See application file for complete search history.

(56) References Cited

U.S. PATENT DOCUMENTS

| | | |
|---|---|---|
| 4,850,007 A | 7/1989 | Marino et al. |
| 5,031,228 A | 7/1991 | Lu |
| 5,105,184 A | 4/1992 | Pirani et al. |
| 5,305,195 A | 4/1994 | Murphy |
| 5,515,270 A | 5/1996 | Weinblatt |
| 5,600,366 A | 2/1997 | Schulman |
| 5,724,521 A | 3/1998 | Dedrick |
| 5,740,549 A | 4/1998 | Reilly et al. |
| 5,781,894 A | 7/1998 | Petrecca et al. |
| 5,793,972 A | 8/1998 | Shane |
| 5,809,242 A | 9/1998 | Shaw et al. |
| 5,838,790 A | 11/1998 | McAuliffe et al. |
| 5,857,175 A | 1/1999 | Day et al. |
| 5,870,724 A | 2/1999 | Lawlor et al. |
| 5,918,014 A | 6/1999 | Robinson |
| 5,937,037 A | 8/1999 | Kamel et al. |
| 5,948,061 A | 9/1999 | Merriman et al. |
| 6,002,393 A | 12/1999 | Hite et al. |
| 6,009,150 A | 12/1999 | Kamel |
| 6,009,409 A | 12/1999 | Adler et al. |
| 6,009,410 A | 12/1999 | LeMole et al. |
| 6,014,502 A | 1/2000 | Moraes |
| 6,026,368 A | 2/2000 | Brown et al. |
| 6,026,369 A | 2/2000 | Capek |
| 6,058,435 A | 5/2000 | Sassin et al. |
| 6,064,967 A | 5/2000 | Speicher |
| 6,067,570 A | 5/2000 | Kreynin et al. |
| 6,085,229 A | 7/2000 | Newman et al. |
| 6,119,098 A | 9/2000 | Guyot et al. |
| 6,134,532 A | 10/2000 | Lazarus et al. |
| 6,141,010 A | 10/2000 | Hoyle |

(Continued)

OTHER PUBLICATIONS

Unpublished U.S. Appl. No. 12/055,610.

(Continued)

*Primary Examiner* — Laurie Ries
*Assistant Examiner* — Frank D Mills
(74) *Attorney, Agent, or Firm* — Chris A. Watt (57) ABSTRACT

Systems and methods of the present invention provide for publishing an announcement of a registered domain name and a link to an associated website on a social networking website. A control panel for the registered domain name and associated website may be displayed on a client.

18 Claims, 7 Drawing Sheets

U.S. PATENT DOCUMENTS

| | | |
|---|---|---|
| 6,188,398 B1 | 2/2001 | Collins-Rector et al. |
| 6,199,106 B1 | 3/2001 | Shaw et al. |
| 6,205,432 B1 | 3/2001 | Gabbard et al. |
| 6,212,554 B1 | 4/2001 | Roskowski |
| 6,216,129 B1 | 4/2001 | Eldering |
| 6,285,987 B1 | 9/2001 | Roth et al. |
| 6,298,341 B1 | 10/2001 | Mann et al. |
| 6,314,451 B1 | 11/2001 | Landsman et al. |
| 6,317,761 B1 | 11/2001 | Landsman et al. |
| 6,338,082 B1 | 1/2002 | Schneider |
| 6,351,745 B1 | 2/2002 | Itakura et al. |
| 6,370,578 B2 | 4/2002 | Revashetti et al. |
| 6,377,936 B1 | 4/2002 | Henrick et al. |
| 6,379,251 B1 | 4/2002 | Auxier et al. |
| 6,385,592 B1 | 5/2002 | Angles et al. |
| 6,442,529 B1 | 8/2002 | Krishan et al. |
| 6,442,549 B1 | 8/2002 | Schneider |
| 6,453,347 B1 | 9/2002 | Revashetti et al. |
| 6,457,025 B2 | 9/2002 | Judson |
| 6,463,585 B1 | 10/2002 | Hendricks et al. |
| 6,470,079 B1 | 10/2002 | Benson |
| 6,484,148 B1 | 11/2002 | Boyd |
| 6,487,538 B1 | 11/2002 | Gupta et al. |
| 6,487,721 B1 | 11/2002 | Safadi |
| 6,496,857 B1 | 12/2002 | Dustin et al. |
| 6,505,169 B1 | 1/2003 | Bhagavath et al. |
| 6,513,052 B1 | 1/2003 | Binder |
| 6,516,338 B1 | 2/2003 | Landsman et al. |
| 6,519,589 B2 | 2/2003 | Mann et al. |
| 6,601,041 B1 | 7/2003 | Brown et al. |
| 6,606,652 B1 | 8/2003 | Cohn et al. |
| 6,622,174 B1 | 9/2003 | Ukita et al. |
| 6,633,850 B1 | 10/2003 | Gabbard et al. |
| 6,647,257 B2 | 11/2003 | Owensby |
| 6,684,249 B1 | 1/2004 | Frerichs et al. |
| 6,714,934 B1 | 3/2004 | Fordham |
| 6,757,661 B1 | 6/2004 | Blaser et al. |
| 6,757,662 B1 | 6/2004 | Greenwald et al. |
| 6,769,031 B1 * | 7/2004 | Bero ............... 709/245 |
| 6,820,277 B1 | 11/2004 | Eldering et al. |
| 6,873,424 B2 | 3/2005 | Jakobsson et al. |
| 6,874,018 B2 | 3/2005 | Wu |
| 6,880,007 B1 * | 4/2005 | Gardos et al. ............ 709/225 |
| 6,880,123 B1 | 4/2005 | Landsman et al. |
| 6,892,181 B1 | 5/2005 | Megiddo et al. |
| 6,892,354 B1 | 5/2005 | Servan-Schreiber et al. |
| 6,898,571 B1 | 5/2005 | Val et al. |
| 6,901,436 B1 | 5/2005 | Schneider |
| 6,925,441 B1 | 8/2005 | Jones, III et al. |
| 6,928,615 B1 | 8/2005 | Haitsuka et al. |
| 6,973,505 B1 | 12/2005 | Schneider |
| 7,281,042 B2 | 10/2007 | Hsu et al. |
| 2002/0052787 A1 | 5/2002 | Matsumoto et al. |
| 2002/0077130 A1 | 6/2002 | Owensby |
| 2002/0091703 A1 | 7/2002 | Bayles |
| 2002/0091827 A1 | 7/2002 | King et al. |
| 2002/0126304 A1 | 9/2002 | Jakobsson et al. |
| 2003/0050863 A1 | 3/2003 | Radwin |
| 2003/0191689 A1 | 10/2003 | Bosarge et al. |
| 2003/0208578 A1 * | 11/2003 | Taraborelli et al. ........ 709/223 |
| 2003/0208624 A1 * | 11/2003 | Grossman ............... 709/245 |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0098375 A1 * | 5/2004 | DeCarlo, III ............... 707/3 |
| 2004/0167928 A1 | 8/2004 | Anderson et al. |
| 2004/0247092 A1 | 12/2004 | Timmins et al. |
| 2004/0249709 A1 | 12/2004 | Donovan et al. |
| 2004/0267723 A1 | 12/2004 | Bharat |
| 2004/0267725 A1 | 12/2004 | Harik |
| 2005/0021397 A1 | 1/2005 | Cui et al. |
| 2005/0038894 A1 * | 2/2005 | Hsu et al. ............... 709/228 |
| 2005/0065806 A1 | 3/2005 | Harik |
| 2005/0071224 A1 | 3/2005 | Fikes et al. |
| 2005/0071325 A1 | 3/2005 | Bem |
| 2005/0096979 A1 | 5/2005 | Koningstein |
| 2005/0125451 A1 * | 6/2005 | Mooney .................... 707/104.1 |
| 2005/0131758 A1 | 6/2005 | Desikan et al. |
| 2005/0144069 A1 | 6/2005 | Wiseman et al. |
| 2005/0144073 A1 | 6/2005 | Morrisroe et al. |
| 2005/0165904 A1 * | 7/2005 | Mooney .................... 709/217 |
| 2005/0203875 A1 * | 9/2005 | Mohammed et al. ........... 707/2 |
| 2005/0216300 A1 * | 9/2005 | Appelman et al. ............. 705/1 |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0251443 A1 | 11/2005 | Chan et al. |
| 2005/0251444 A1 | 11/2005 | Varian et al. |
| 2007/0130109 A1 * | 6/2007 | King et al. .................. 707/2 |
| 2007/0185855 A1 * | 8/2007 | Shah et al. .................. 707/5 |
| 2008/0005342 A1 * | 1/2008 | Schneider ............... 709/230 |
| 2008/0033866 A1 * | 2/2008 | Boswell et al. ............ 705/37 |
| 2008/0066080 A1 * | 3/2008 | Campbell ................ 719/314 |
| 2008/0201413 A1 * | 8/2008 | Sullivan et al. ........... 709/203 |
| 2008/0201421 A1 * | 8/2008 | Adelman et al. .......... 709/204 |
| 2008/0222130 A1 * | 9/2008 | Patel et al. ................. 707/5 |
| 2008/0270418 A1 * | 10/2008 | Chen et al. ................ 707/10 |
| 2008/0288491 A1 | 11/2008 | Wu et al. |
| 2008/0294607 A1 * | 11/2008 | Partovi et al. ............... 707/3 |
| 2008/0294711 A1 * | 11/2008 | Barber ..................... 709/201 |
| 2009/0182589 A1 * | 7/2009 | Kendall et al. .............. 705/5 |
| 2009/0265233 A1 * | 10/2009 | Sendo et al. .............. 705/14 |
| 2009/0265415 A1 * | 10/2009 | Harry ..................... 709/202 |
| 2009/0282144 A1 * | 11/2009 | Sherrets et al. ........... 709/224 |
| 2010/0042487 A1 * | 2/2010 | Barazani .................. 705/14.13 |
| 2010/0057859 A1 * | 3/2010 | Shen et al. ............... 709/206 |
| 2010/0058210 A1 * | 3/2010 | Johnson ................... 715/764 |
| 2010/0228759 A1 * | 9/2010 | Thomas .................... 707/758 |
| 2011/0023101 A1 * | 1/2011 | Vernal et al. ................ 726/7 |

OTHER PUBLICATIONS

Unpublished U.S. Appl. No. 12/055,881.
Unpublished U.S. Appl. No. 12/055,905.
Unpublished U.S. Appl. No. 12/055,937.
Unpublished U.S. Appl. No. 12/328,601.
Unpublished U.S. Appl. No. 12/328,616.
Unpublished U.S. Appl. No. 12/561,408.
Unpublished U.S. Appl. No. 12/561,439.
May 25, 2012 response to Feb. 27, 2012 Office Action in related U.S. Appl. No. 12/561,439.
Aug. 8, 2012 Notice of Allowance in related U.S. Appl. No. 12/561,439.

* cited by examiner

File Recipient Online File Folder Control Panel – Browser http://

Domain Name and Hosted Website Control Panel – financialcrisis.com

Domain Name Announcement and Hosted Website Link

[√] I give permission to have an announcement of this domain name and a link to a hosted website published on social networking websites. I also acknowledge that a $20 fee may apply.

| Delay publication until the hosted website is complete ▽ | Delay for | 30 | days |

Publish immediately to generate traffic as a parked domain page
Website is complete, publish immediately as a hosted website

[√] Confirm publication after expiration of delay period – email [me@user.us] phone [123.4567]

[√] Also publish the announcement and link on my personal page – username [User] password [***]

[√] Allow me to announce and publish new website developments to my personal page

Social Networking Website API

[√] Synchronize information on this form with the social networking API, or view the API separately.

Traffic Monitoring/Product Suggestions

Allow registrar/host to monitor traffic via 301 redirect and make product suggestions ▽

Allow registrar/host to monitor traffic via 301 redirect to gauge success of website/page
Display traffic-improving products in a new window that I can purchase immediately

[√] Please copy me on results of monitored traffic, so I know the success of the website/page

File Recipient Online File Folder Control Panel – Browser http://

Domain Name and Hosted Website Control Panel – financialcrisis.com

Domain Name Announcement and Hosted Website Link

[✓] I give permission to have an announcement of this domain name and a link to a hosted website posted as search engine feeds. I also acknowledge that a $20 fee may apply.

| Delay posting feeds until the hosted website is complete ▽ | Delay for 30 days |

Post immediately to generate traffic as a parked domain page
Website is complete, post immediately as a hosted website

[✓] Confirm feed post after expiration of delay period – email  me@user.us   phone  123.4567

[✓] Post feed to my website and/or blog – site  www.mysite.com   blog  blog.mysite.com

[✓] Post feed to social networking website widget or other profile -- site  www.othersocialnetwork.com

Social Networking Website API

[✓] Synchronize information on this form with the social networking API, or view the API separately.

Traffic Monitoring/Product Suggestions

Allow registrar/host to monitor traffic via 301 redirect and make product suggestions ▽

Allow registrar/host to monitor traffic via 301 redirect to gauge success of website/page
Display traffic-improving products in a new window that I can purchase immediately

[✓] Please copy me on results of monitored traffic, so I know the success of the website/page

FIG. 7

SOCIAL WEBSITE DOMAIN REGISTRATION ANNOUNCEMENT AND SEARCH ENGINE FEED

CROSS REFERENCE TO RELATED PATENT APPLICATIONS

This patent application is related to the following concurrently-filed patent application:

U.S. patent application Ser. No. 12/561,439, "Announcing a Domain Registration on a Social Website."

The subject matter of all patent applications is commonly owned and assigned to Go Daddy Operating Company, LLC. All prior applications are incorporated herein in their entirety by reference.

FIELD OF THE INVENTION

The present inventions generally relate to the field of social networking websites and more specifically to publishing or posting an announcement of a domain name on a social networking website.

SUMMARY OF THE INVENTION

An example embodiment of a method for publishing an announcement of a registered domain name and link to a hosted website on a social networking website may include the steps of partnering with a social networking website, displaying a control panel on a client to obtain permission and set a delay period after which to publish the announcement and link, publishing the announcement and link after expiration of the delay period, monitoring traffic generated by the link and recommending a product to increase traffic to the hosted website, based on a metric to monitor the website traffic.

An example embodiment of a method for posting a search engine result to a feed from a social networking site regarding an announcement of a registered domain name and link to a hosted website may include the steps of partnering with a social networking website, displaying a control panel on a client to obtain permission and set a delay period after which to post the announcement and link, posting the announcement and link after expiration of the delay period, monitoring traffic generated by the link and recommending a product to increase traffic to the hosted website, based on a metric to monitor the website traffic.

The features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC: BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

Social networking websites may comprise Internet-based social networking services that focus on building and verifying online social networks for communities of people who may share interests and activities, wish to communicate with each other efficiently, and may be interested in exploring the interests and activities of others, and which necessitates the use of software applications. Most social networking websites are Internet based and provide a collection of various ways for users to interact, such as micro-blogging, blogging, chat, forums, instant messaging, email, video, voice chat, file sharing, discussion groups, etc. The main types of social networking services are those that contain directories of some categories (such as former classmates), means to connect and communicate with friends, and/or recommendation systems linked to trust. Popular social networking websites now combine many of these, with TWITTER, MYSPACE, FACEBOOK, YOUTUBE, LINKEDIN, and FLICKR being but a few examples.

Methods for Publishing an Announcement and Link on a Social Website

Figure 1:
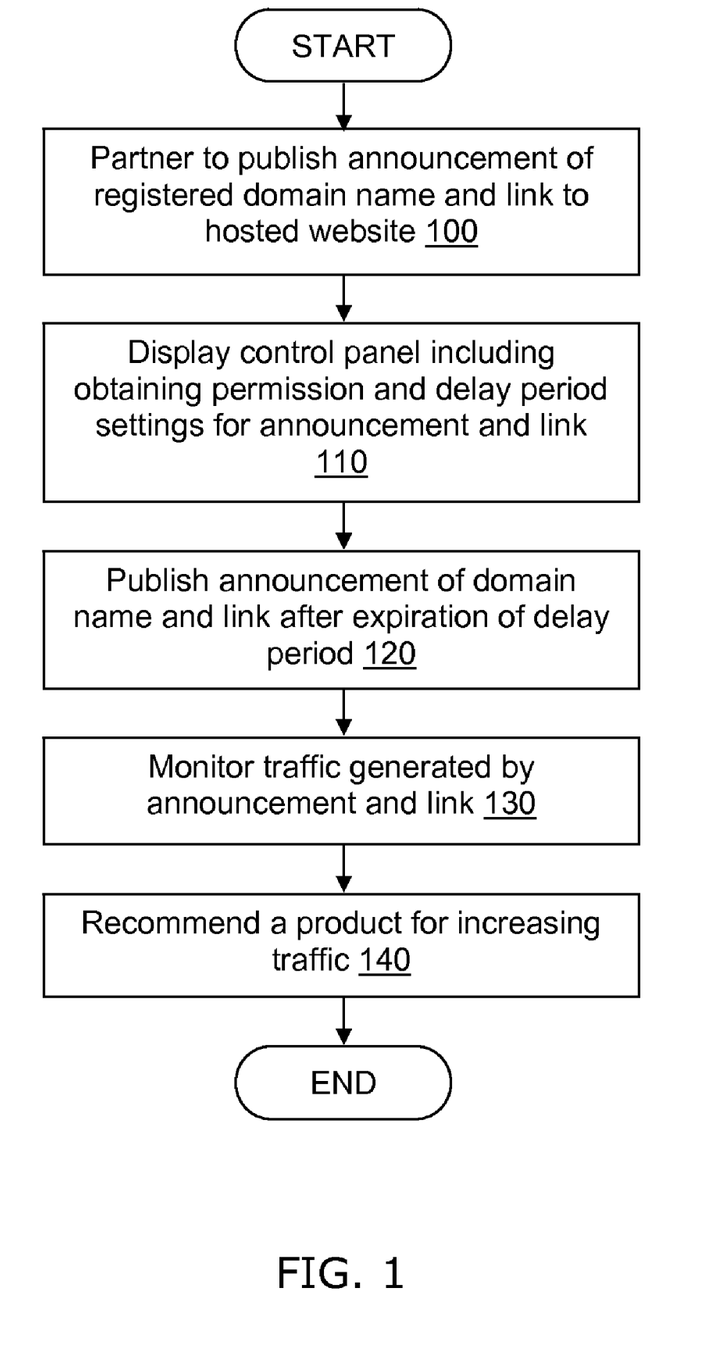
FIG. 1 is a flow diagram illustrating a possible embodiment of a method for publishing an announcement and link on a social networking website.

Several different methods may be used to provide and manage the disclosed invention. In an example embodiment illustrated in FIG. 1, a partnership may be established with a social networking website to publish an announcement of a registered domain name and a link to a hosted website on the social networking website. (Step 100) The hosted website may be associated with the registered domain name. A control panel may be displayed on a client (Step 110), which may include means for obtaining permission to publish the domain name announcement and link and a delay period after which the announcement and link may be published. After the expiration of the delay period, the announcement and link may be published (Step 120). Traffic generated by the announcement and/or link to the hosted website may be monitored (Step 130) and a product may be recommended for increasing a metric which measures traffic to the hosted website generated by the announcement and link (Step 140).

Figure 2:
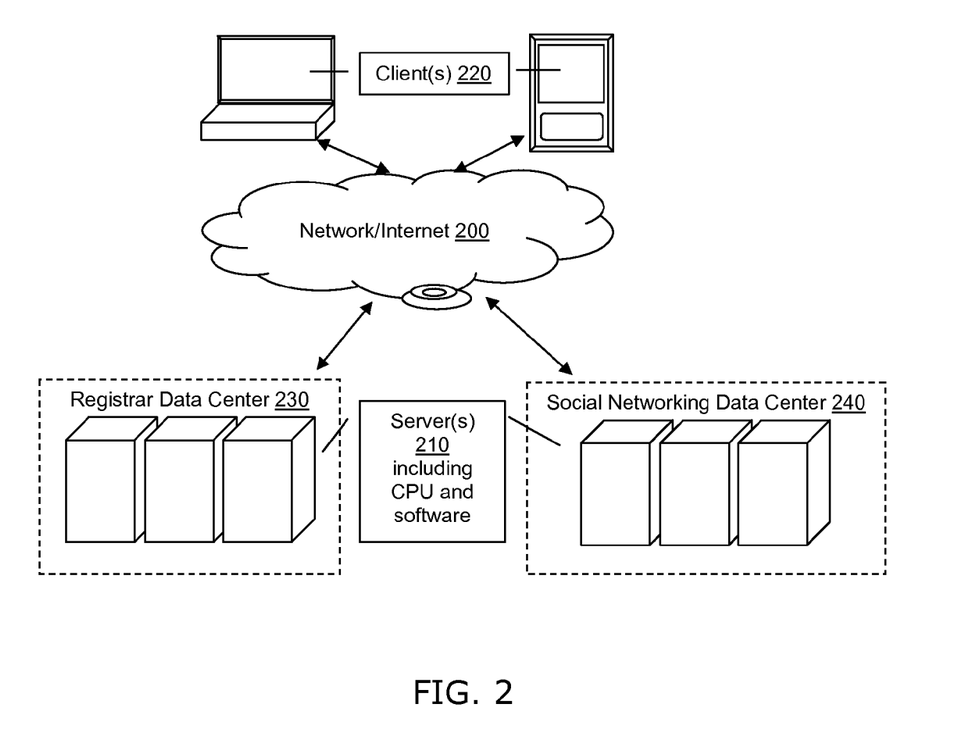
FIG. 2 illustrates a possible system in which an announcement and link on a social networking website may be published or posted as a feed of a search engine result.

FIG. 2 illustrates a non-limiting example of a system and/or structure that may be used to accomplish the methods and embodiments disclosed and described herein. Such methods may be performed by any central processing unit (CPU) in any computing system, such as a microprocessor running on at least one server 210, and executing instructions stored (perhaps as scripts and/or software) in computer-readable media accessible to the CPU, such as a hard disk drive on a server 210. The server(s) 210 may be communicatively coupled to a network 200 (such as the Internet) and at least one client 220 that, collectively (along with the software described herein), may allow a registrant to register domain names, request and/or view publication and/or posting of announcements of registered domain names and their associated hosted websites, manage their domain name or hosted website via a control panel, synchronize such a control panel to an API for a social networking website and/or accomplish any other methods disclosed herein.

Such servers 210 could comprise any computer or program that provides services to other computers, programs, or users either in the same computer or over a computer network 200. As non-limiting examples, servers may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof). Clients 220 that may be used to connect to the network 200 to use the illustrated embodiments may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

The example embodiments herein place no limitation on network configuration or connectivity. Thus, as non-limiting examples, the network 200 could comprise the Internet, the public switched telephone network, the global Telex network, computer networks (e.g., an intranet, an extranet, a local-area network, or a wide-area network), wired networks, wireless networks, or any combination thereof. Examples of clients 220 that may be used may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Servers 210 and clients 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

A domain name may be registered to a registrant (perhaps by one of the above-described servers) by any domain name registration method known in the art or developed in the future, perhaps via a website-enabled domain name purchase and registration system, such as that described in detail above. Alternatively, domain name registration may be accomplished via human to human communication, perhaps via a telephone call or in-person meeting. Domain names may be registered by, as non-limiting examples, any individual or entity including, but not limited to a domain name registry, domain name registrar, hosting provider, and/or software application developer or distributor. The registrant may comprise, as a non-limiting example, any individual or entity including, but not limited to, a person, a business, a governmental institution, an educational institution, a non-profit organization, or a social organization.

The illustrated embodiments place no limitation on the format the domain name may take. While future iterations of the DNS may establish alternate domain name formats (perhaps using different alphanumeric structures or file types such as image, audio, or video files functioning as a domain name or a similarly-functioning resource locator), which are explicitly contemplated by this patent application, the traditional domain name structure comprises a root name (i.e., "mycompany" in the domain name mycompany.com) concatenated to a top-level domain (i.e., ".com" in the domain name mycompany.com).

The hosted website may be associated with a domain name as described in detail above. In a non-limiting example embodiment, a domain name registrar which provides domain name services may also provide hosting services for the hosted website including, but not limited to hosting one or more computers or servers in a data center 230 as well as providing the general infrastructure necessary to offer hosting services to Internet users including hardware, software, Internet web sites, hosting servers, and electronic communication means necessary to connect multiple computers and/or servers to the Internet or any other network 200.

A social networking data center 240 may likewise host the information needed for administration of a social networking website, including the general hosting infrastructure described above. Such a social networking data center 240 may accept messages from text messages, SMS, web, mobile web, instant message, third party API projects or other third party applications.

In a non-limiting embodiment, the hosted website may be a parked domain page, possibly used for parked domain monetization. A parked domain page may refer to registering an internet domain name without associating the domain name with any services such as email or a hosted website. This may be done to reserve the website for future development, and may include a single "coming soon" or "under construction" hosted webpage.

The hosted website may also be used by the domain name registrant, registrar or any advertising publishers for parked domain monetization, as its own hosted website or while the hosted website is being completed. Parked domain monetization, such as GODADDY.COM'S CASH PARKING, may use a domain name which resolves to a hosted website containing advertising listings and links. The parked domain page may use a "pay-per-click" model, so that the domain holder may be paid based on how many links have been visited and how successful those visits have been.

If a domain name registrant chooses an option on the control panel to immediately generate traffic, via the published link, for the parked domain page (illustrated in FIG. 4 and described in detail below), a metric, such as a pay-per-click model or click-through traffic based on 301 redirects, described below, or any other metric for measuring additional traffic may be monitored to gauge the success of the parked domain page. A registrant may have the option of keeping the domain a parked domain page to generate traffic and revenue, or may keep the domain a parked page only prior to completion of the final hosted website.

As described above, a social website application may be hosted in a social networking data center 240, which may comprise social networking services that focus on building and verifying online social networks for communities of people who may share interests and activities, wish to communicate with each other efficiently and may be interested in exploring the interests and activities of others, which necessitates the use of software applications. These applications may include "widgets" which may be a portable chunk of code which can be incorporated into a web page without requiring recompiling the code. There is a significant viral effect to social networking website applications, since social networking updates may be posted to websites, blogs, widgets, other social networking websites and profiles, or shared through text messages or other third party applications.

A social networking website application may implement one, some, or all of the above-described software applications and may use a common username or screen name for some or all communications transmitted via the social website application. FACEBOOK, MYSPACE, and LINKEDIN are a few well-known examples of social website applications. FACEBOOK, for example, allows users to register a screen name (i.e., "Facebook username") that may be associated with some or all FACEBOOK content and/or communications. The screen name and a password may be used by some social networking website users to access their information stored on the social networking website.

Figure 3:
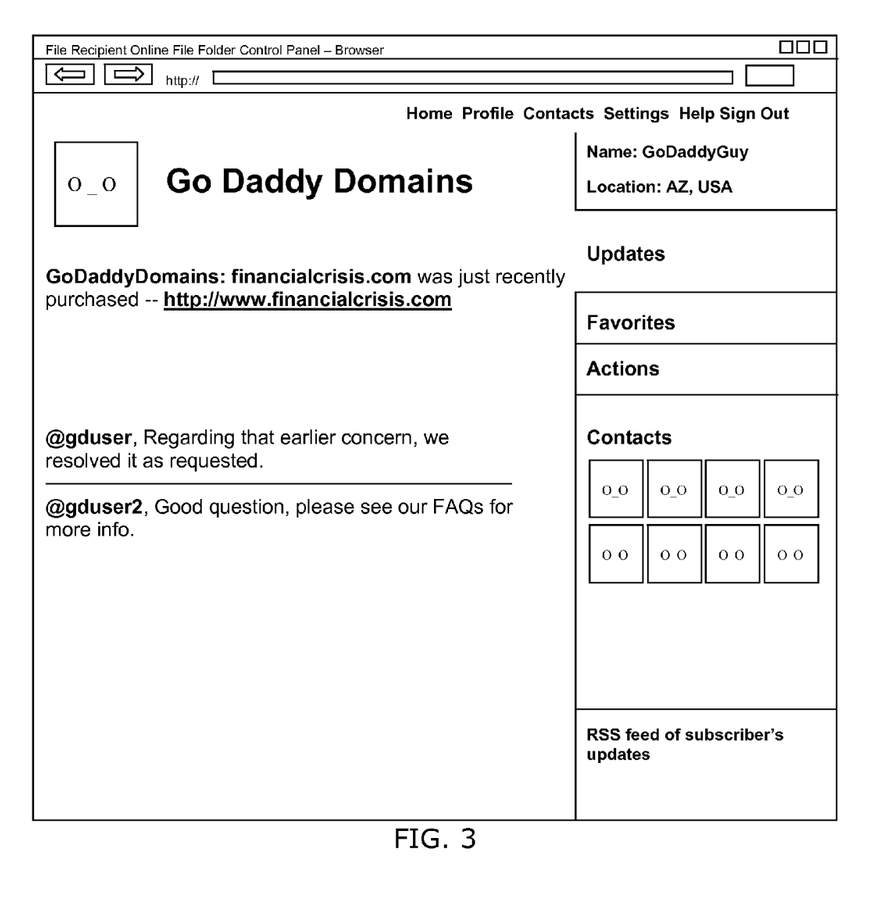
FIG. 3 illustrates a possible embodiment of an interface including the published announcement and link on a social networking website.

FIG. 3 shows an example user interface for a social networking website. This interface may be displayed, as shown, on a client 220 using the structure disclosed herein, and may be used in disclosed embodiments to demonstrate the published announcement of a registered domain name and a link to a hosted website associated with the registered domain name.

The non-limiting illustrated example of a user interface for such a social networking website shown in FIG. 3 illustrates a "company page" for a domain name registrar. Such a company page may be used for publishing the registrar's general announcements, updates, FAQs, announcements of registered domain names, links to associated hosted websites etc. In this way, any contacts, "friends" or "followers" may stay informed about the company through information published on their social networking page. In this context, users of the social networking website can become "friends" with one another, or simply be a "follower" of another social networking website user.

In another embodiment, the announcement of a registered domain name, or links to any associated hosted website may be published on a registrant's "personal page," used for the registrant's personal updates. Such updates may include the purchase of the domain name from the domain name registrar, and any link to an associated hosted website.

Another embodiment may allow the domain name registrar to publish the announcement of the registered domain name and the link to the hosted website on both the domain name registrar's company page and the domain name registrant's personal page. To accomplish this, the domain name registrant may provide the domain name registrar with a user name or screen name and/or a password via a control panel illustrated in FIG. 4 and described in detail below.

In the non-limiting example in FIG. 3, the company site is used for published updates relating to Go Daddy Domains. In this example, a registrant has purchased the domain name "financialcrisis.com." An announcement of the domain name purchase by the registrant from the registrar is included, and the published update concludes with a link to the website "http://www.financialcrisis.com." Contacts with the company or the individual (including "friends" or "followers") on the social networking website, such as gduser and gduser2 (or other contacts illustrated in the "Contacts" section) in this example, may see and follow the updates on either the illustrated company page for the domain name registrar, a personal page for the registrant that registered financialcrisis.com, or both.

The link at the conclusion of the announcement may allow contacts to click-through to the newly created hosted website "http://www.financialcrisis.com," thereby creating traffic to the hosted website for the newly registered domain name, and this click-through traffic may be monitored to determine the success of the associated website. This website may be either a newly created website or a parked domain page as described above.

Figure 4:
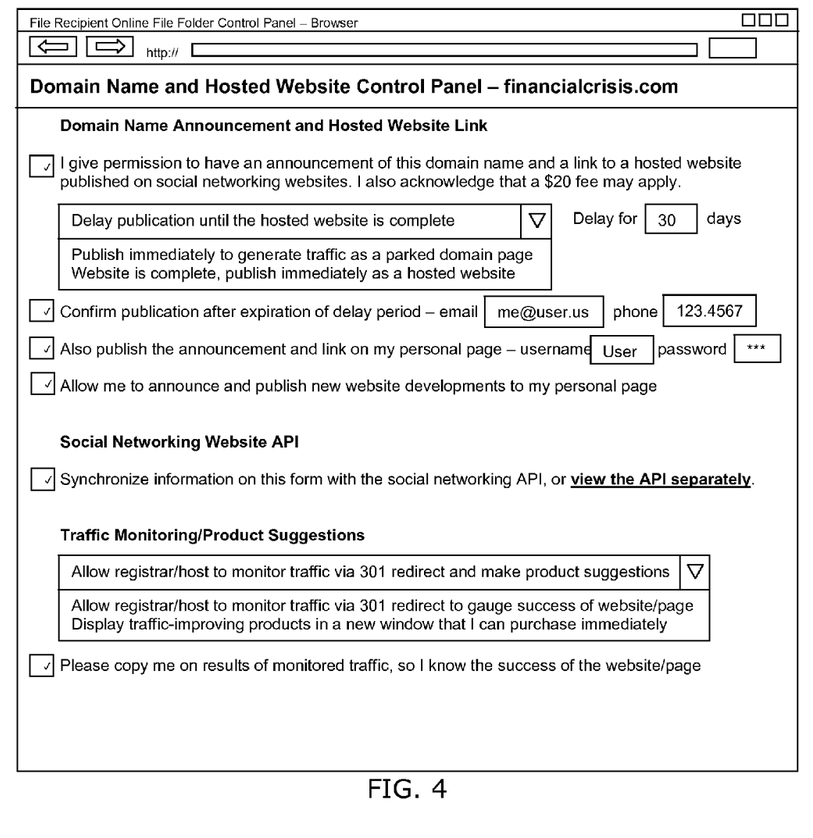
FIG. 4 illustrates a possible embodiment of an interface including a control panel to publish the announcement and link on a social networking website.

In the non-limiting example interface seen in FIG. 4, a control panel for a registered domain name and a hosted website may be displayed on a client machine 220 to a domain name registrant. The control panel may be a computer user interface which utilizes a control panel metaphor to allow the user control of software and hardware features. The user interfaces may be any aggregate of means by which users such as the domain name registrar or domain name registrant interact with the system, including a particular machine, device, computer program or other complex tools.

The control panel may comprise means of obtaining permission to publish the announcement of the newly registered domain name, and link to an associated hosted website, and may also include means for setting a delay period after which to publish the announcement and link. In the non-limiting example interface in FIG. 4, this may be accomplished by drop down menus, text boxes, one or more check boxes or any other user interface tools known to collect user information.

As previously mentioned, the control panel may also include an option to publish the announcement and link on both a company page for the domain name registrar and a personal page for the domain name registrant if the registrant provides a username/screen name (and password, as necessary) for accessing their social networking account. In this example embodiment, checkboxes on the control panel may be used to determine if the announcement and link will be published on the registrant's company page, the registrant's personal page, or both.

If the registrant chooses to create a parked domain page for the registered domain name, the control panel may also allow the registrant to immediately generate traffic, via the link to the hosted website for the parked domain page. The monitored metric, which may include pay-per-click, click-throughs, 301 redirects (described below) or any other metric known in the art for monitoring traffic may be used to gauge the success of the parked domain page or hosted website.

In another embodiment, the registrant may have prepared all necessary files or other documentation for publishing the website immediately. In this case, another option may be provided in which the registrant may choose to have no delay period, which would allow the website, announcement and link to be published immediately. This embodiment may likewise use click-throughs, 301 redirects (described below) or any other metric known in the art for monitoring traffic to gauge the success of the published hosted website.

In the non-limiting example embodiment illustrated in FIG. 4, the means for obtaining permission may include a fee charged to the registrant (here a $20 fee) for publishing the announcement and the link.

As seen in FIG. 4, the control panel may provide access to an Applications Programming Interface (API), perhaps accessible via the network. In another embodiment, the information collected in the control panel may be passed to the API via any other means known in the art. All disclosed embodiments allow the control panel to be synchronized with the API. In the illustrated example, the user may choose to synchronize all information gathered in the control panel with the API, or may click on an included link to access the API separately, possibly by viewing the API in a separate window or browser.

An API may be a software-to-software interface that specifies the protocol defining how independent computer programs interact or communicate with each other. The API may allow a requesting party's software to communicate and interact with the software application and/or its provider—perhaps over a network—through a series of function calls (requests for services). It may comprise an interface provided by the software application and/or its provider to support function calls made of the software application by other computer programs, perhaps those utilized by the requesting party to provide information for publishing or posting domain name and hosted website information.

The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

FIG. 4 also shows that the control panel may include an option to purchase a product to increase traffic to the hosted website, thereby increasing the monitored metric for traffic generated by the link to the hosted website. Examples of such products may include GO DADDY'S TRAFFIC BLAZER or BUSINESS REGISTRATION. In one embodiment, the product recommended may be suggested based on the results of the monitored metric for traffic generated by the link to the hosted website. Other embodiments may allow the user to immediately order such products by displaying such traffic-improving products in a new window so that the user may purchase these products immediately.

Prior to publishing the announcement and link, the registrant may choose, via the control panel, to receive notice of expiration of the delay period and/or notice that the announcement and link will be published on the social networking website. Such notice may comprise any electronic response received (perhaps at a server computer responsive to a request sent in kind) including, but not limited to, a Hyper Text Transfer Protocol (HTTP) request, email message, and/or Short Message Service (SMS) message (i.e., text message). Notice also may be received via paper mail, telephone conversation, person to person contact, or any other means for receiving delay period expiration notice known in the art or developed in the future.

In another embodiment, the registrant may publish, during the delay period, announcements of updates or new developments to the site on his or her personal page on the social networking website. On completion of the website, the announcement and link may be published on the company page, the personal page or both. In the illustrated embodiment, a checkbox may be selected which allows the registrant to announce and publish new website developments to the registrant's personal page.

In another embodiment, information may be gathered about the hosted website to determine the readiness for publishing the announcement and link. For example, if the original page consists of only a "coming soon" or "under construction" page, changes in the amount of web pages included in the hosted website may trigger an announcement and link to be published, or at least a status update on the registrant's personal page.

Likewise, a sharp rise in traffic to the site may also indicate to the system that the announcement and link should be published. By "pinging" the website in these ways, the system may be at least partially automatic in determining if the announcement of the domain name and link to the associated website should be published. Alternatively, contact information collected from the registrant or user (described below) may also be used to confirm that the announcement and link are ready to be published.

The monitored metric for traffic generated by the link to the hosted website may be accomplished via a domain name registrar or host of the hosted website linking to the registered domain name using a server-side or other 301 redirect. The registrar or host may choose to link to the domains via 301 redirect to allow them to count click-throughs. These click-throughs may be used as a means to gauge the success of the link as reflected in the monitored metric of traffic to the site via the link. These metrics may be used to gauge the success of the announcement/link and recommend a product to the user, based on the success of the distribution of the announcement/link.

A 301 redirect may be a method for webpage redirection (often interpreted as "moved permanently") while preserving search engine rankings for that particular page. It may be effective in the context of the current invention in that if file names change or pages are moved, the search engine rankings may be preserved between old pages and new pages. Use of such redirects may give the website host and/or domain name registrar information on the success of the distribution of the hosted website via the link from the social networking website.

As an example, after a web page is requested, a web server may use an .htaccess file which contains specific instructions for certain requests, including security, redirection issues and how to handle certain errors. The old page and the page to be redirected to may be edited in such a file with the command "redirect 301/old/old.htm http://www.you.com/new.htm," where old/old.htm is a top-down link to the old page. Any other known form of using a 301 redirect in the art may also be used to accomplish monitoring website traffic from the link.

The hosted website may also be accessed through several different URLs. If URLs are used to reach the homepage, one of those URLs may be used as the preferred (canonical) destination and 301 redirects may be used to send traffic from the other URLs to the preferred URL.

As seen in FIG. 4, the user of the control panel may elect to have the results of the monitored metric to measure traffic sent to them so that they may know the success of the website or parked domain page. Product suggestions may be made to the user of the control panel based on the results of the monitored metric. In other embodiments, the suggested products may be offered as an add-on to another offered product, or may be bundled together with other products.

Methods for Posting an Announcement and Link on a Social Website

Figure 5:
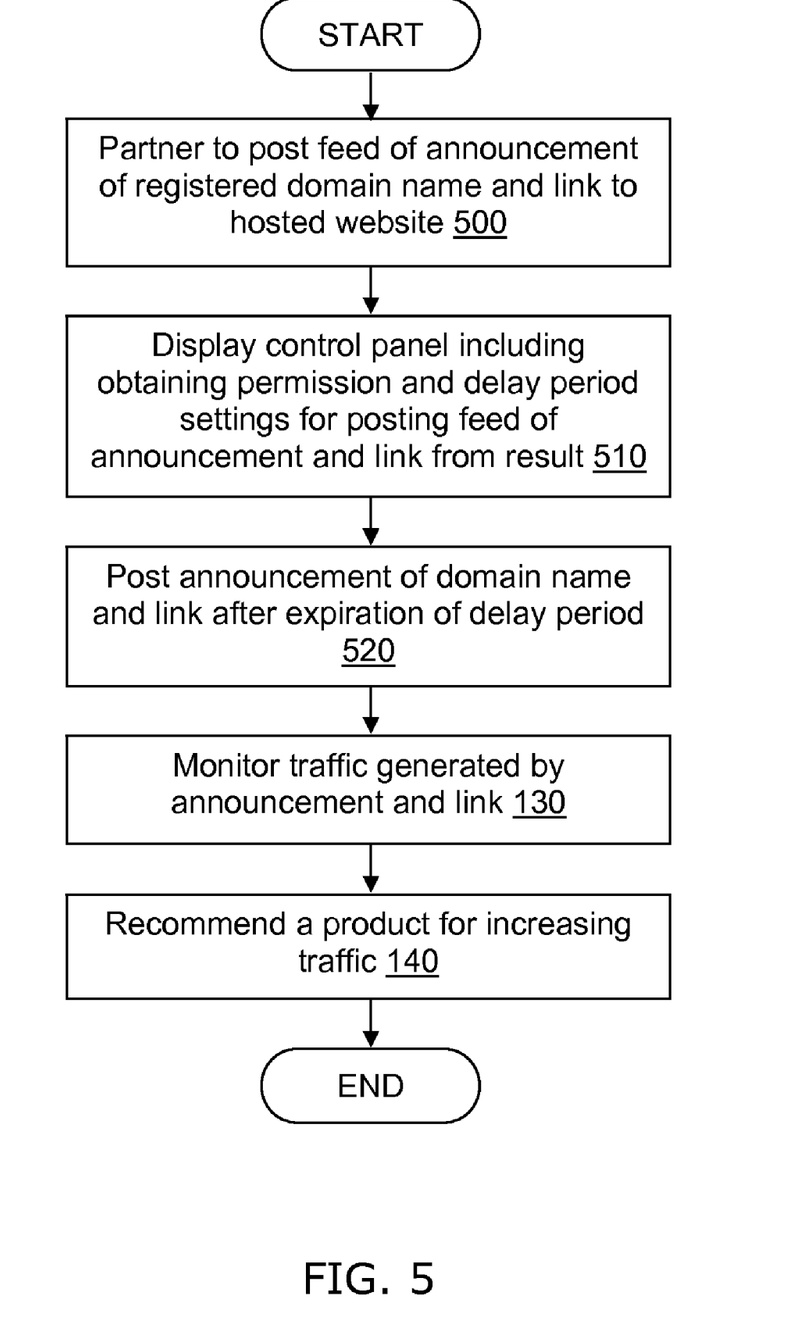
FIG. 5 is a flow diagram illustrating a possible embodiment of a method for posting an announcement and link as a search engine result on a social networking website.

Several different methods may be used to provide and manage the disclosed invention. In an example embodiment illustrated in FIG. 5, a partnership may be established with a social networking website to post a search engine result to a feed from the social networking website, the feed including an announcement of a registered domain name and a link to a hosted website. (Step 500) The hosted website may be associated with the registered domain name.

A control panel may be displayed on a client (Step 510), which may include means for obtaining permission to post the search engine result to a feed from a social networking site including the domain name announcement and link. The control panel may also include means to set a delay period after which to post the search engine result to the feed including the announcement and link. After the expiration of the delay period, the announcement and link may be posted as a search engine result (Step 520). Traffic generated by the announcement and/or link to the hosted website may be monitored (Step 130) and a product may be recommended for increasing the metric which measures traffic generated to the hosted website (Step 140). A system and/or structure using the elements illustrated in FIGS. 2-4 and described in detail above may be used to accomplish the methods and embodiments associated with the embodiments illustrated in FIGS. 5-7.

Figure 6:
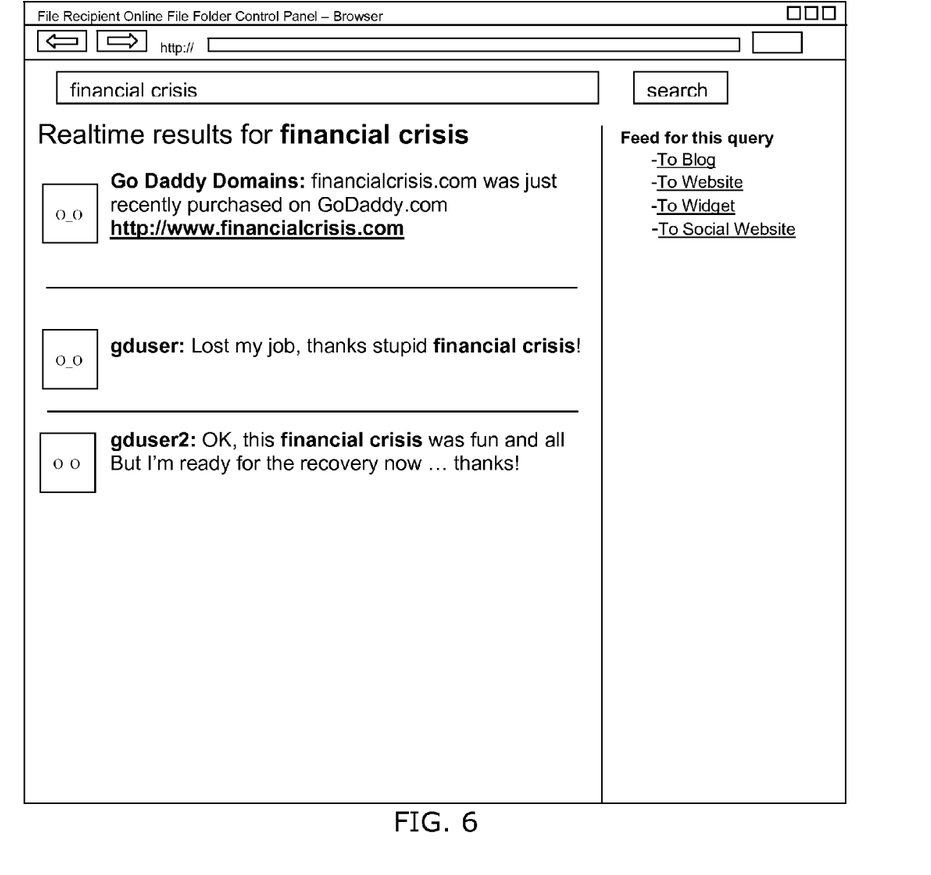
FIG. 6 illustrates a possible embodiment of an interface including the posted announcement and link as a search engine result on a social networking website.

FIG. 6 shows an example user interface for posting a feed for a search result from a social networking website, including an announcement of a registered domain name and a link to a related hosted website. This interface may be displayed as shown on a client 220 using the structure disclosed herein, and may be used in disclosed embodiments to demonstrate the search result posted to a feed including the announcement of a registered domain name and a link to a hosted website associated with the registered domain name.

The non-limiting illustrated example of a user interface for such a social networking website shown in FIG. 6 illustrates a search result for the phrase "financial crisis" on a social networking website. In this example, a registrant has purchased the domain name "financialcrisis.com." An announcement of the domain name purchase by the registrant from the registrar is included in the search results, and the announcement includes a link to the website "http://www.financialcrisis.com." These search results for this query may be posted to a blog, a website, a social networking website widget or to a profile for another social networking website.

The link at the conclusion of the announcement may allow contacts to click-through to the newly created hosted website "http://www.financialcrisis.com," thereby creating traffic to the hosted website for the newly registered domain name. This website may be either a newly created website or a parked domain page as described above. Likewise, users of the social networking website (such as gduser and gduser2 in this example) may find the announcement to the registered domain name and link to the related hosted website through any relevant searches on the social networking website or through RSS feeds on various blogs, websites, widgets, other social networking websites, etc.

The feeds generated may conform to the Really Simple Syndication (RSS) specification. RSS is a Web content syndication format and may be a dialect of Extensible Markup Language (XML).

Figure 7:
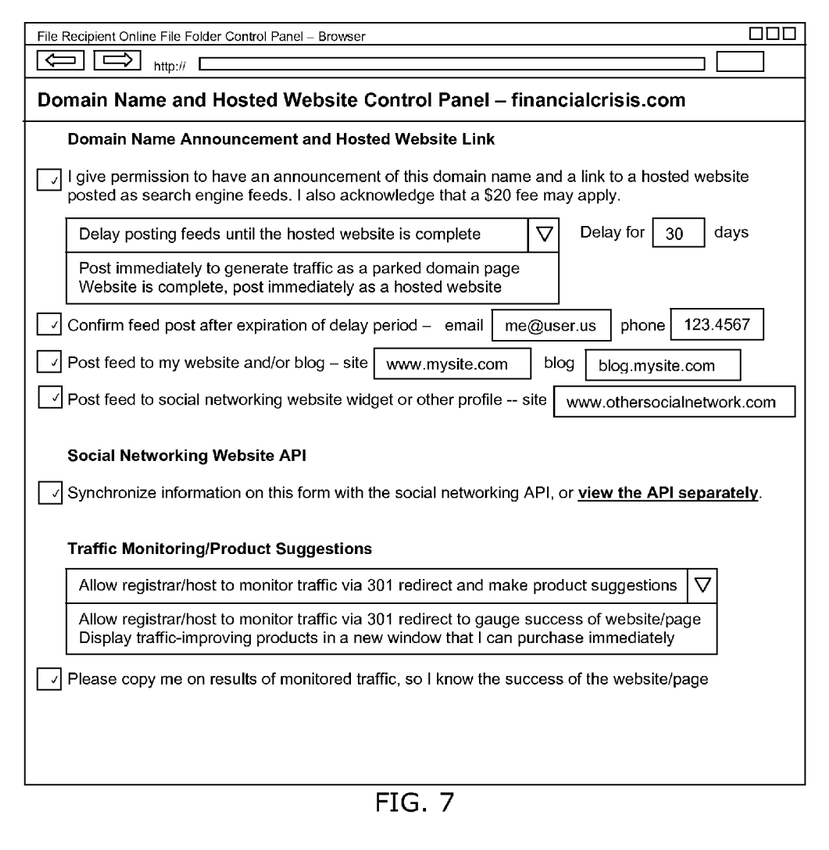
FIG. 7 illustrates a possible embodiment of an interface including a control panel to post the announcement and link as a search engine result on a social networking website.

In the non-limiting example interface seen in FIG. 7, a control panel for a registered domain name and a hosted website may be displayed on a client machine 220 to a domain name registrant according to the detailed description of such a control panel given above.

The control panel may comprise means of obtaining permission to post the announcement and link as feeds of search engine results and means for setting a delay period after which to post the feed of search engine results including the announcement and link. If the registrant chooses to create a parked domain page for the registered domain name, the control panel may also allow the registrant to immediately generate traffic, via the link to the hosted website for the parked domain page. The monitored metric, which may include pay-per-click, click-throughs, 301 redirects or any other metric known in the art for monitoring traffic may be used to gauge the success of the parked domain page or hosted website.

In another embodiment, the registrant may have prepared all necessary files for posting the announcement and link to the website immediately. In this case, another option may be provided in which the registrant may choose to have no delay period, which would allow the website, announcement and link to be posted immediately. This embodiment may likewise use click-throughs, 301 redirects or any other metric known in the art for monitoring traffic to gauge the success of the published hosted website.

In the non-limiting example embodiment illustrated in FIG. 7, the means for obtaining permission may include a fee charged to the registrant (here a $20 fee) for posting the announcement and the link.

As seen in FIG. 7, the control panel may provide access to an Applications Programming Interface (API), perhaps accessible via the network. In another embodiment, the information collected in the control panel may be passed to the API via other means, including means described in the detailed description of an API given above. In the illustrated example, the user may choose to synchronize all information gathered in the control panel with the API, or may click on an included link to access the API separately, possibly by viewing the API in a separate window or browser. Using this API, the social networking website user may be able to associate key words with the link, thereby allowing the user to have the announcement and link shown in any searches that use the associated keywords.

FIG. 7 also shows that the control panel may include an option to purchase a product to increase traffic to the hosted website, thereby increasing the monitored metric for traffic generated by the link to the hosted website. In one embodiment, the product recommended may be suggested based on the results of the monitored metric for traffic generated by the link to the hosted website.

Prior to posting the announcement and link, the registrant may choose, via the control panel, to receive notice of expiration of the delay period and/or notice that the announcement and link will be posted on the social networking website, according to the means of providing notice described in detail above.

In another embodiment, information may be gathered about the website to be posted as a search engine result to determine the readiness for posting the announcement and link as described in detail above.

The monitored metric for traffic generated by the link to the hosted website may be accomplished via a domain name registrar or host of the hosted website linking to the registered domain name using a 301 redirect, as described in detail above. The registrar or host may choose to link to the domains via 301 redirect to allow them to count click-throughs. These click-throughs may be used as a means to gauge the success of the link as reflected in the monitored metric of traffic to the site via the link. These metrics may be used to gauge the success of the announcement/link and recommend a product to the user, based on the success of the distribution of the announcement/link.

As seen in FIG. 7, the user of the control panel may elect to have the results of the monitored metric to measure traffic sent to them so that they may know the success of the website or parked domain page. Product suggestions may be made to the user of the control panel based on the results of the monitored metric. In other embodiments, the suggested products may be offered as an add-on to another offered product, or may be bundled together with other products.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising one or more server computers communicatively coupled to a network and running:
   A) one or more domain name registration modules configured to register one or more domain names; and
   B) one or more announcement modules configured to:
      i) generate a website content comprising:
         a) an announcement of a registration of one of said one or more domain names to a registrant; and
         b) a hyperlink to a website resolving from said one of said one or more domain names;
      ii) receive from said registrant, via a client computer communicatively coupled to a network:
         a) one or more authentication credentials for accessing an account for said registrant on a social networking website; and
         b) a delay period after which to publish said website content on a web page for said account for said registrant on said social networking website; and
      iii) responsive to an expiration of said delay period:
         a) authenticate to, with said one or more authentication credentials, via a social networking application programming interface, said account for said registrant on said social networking website; and
         b) publish said website content to said social networking website via said social networking application programming interface.

2. The system of claim 1, wherein said announcement module is further configured to detect:
   i) a plurality of general website traffic to said website;
   ii) a plurality of website traffic generated by said hyperlink;
   iii) a plurality of pay per click or click through traffic generated by one or more server redirects from said hyperlink; and
   iv) one or more changes to an amount of web pages in said website.

3. The system of claim 2, wherein said announcement module is further configured to:
   i) responsive to a detected change to said amount of web pages in said website, automatically publish on said web page, during said delay period and via said social networking application programming interface, one or more announcements of one or more website updates or developments; and
   ii) responsive to a detected increase in said website traffic generated by said hyperlink, automatically publish said website content to said social networking website via said social networking application programming interface.

4. The system of claim 1, wherein said one or more server computers are configured to receive a plurality of control panel information from a control panel on said client computer, said plurality of control panel information being used by said one or more servers to:
   i) manage said one or more domain names and one or more hosted websites;
   ii) grant permission to publish said website content;
   iii) access and configure said social networking application programming interface;
   iv) identify a selection by said registrant to:
      a) immediately generate traffic for a parked web page via said hyperlink; and
      b) immediately publish one or more website content files for said website and an announcement of a finished hosted website;
   v) identify a preference by said registrant to receive an electronic notice of said expiration of said delay period;
   vi) a preference by said registrant to receive notice, prior to said website content being published, that said website content will be published; and
   vii) receive notice that said registrant will publish one or more announcements of one or more updates or one or more new developments to said website during said delay period.

5. The system of claim 4, wherein said social networking application programming interface:
   i) comprises a software interface provided by said social networking website to support function calls or requests for services made of said social networking website by one or more computer programs on said one or more server computers or said client computer;
   ii) is accessed via said one or more authentication credentials;
   iii) receives, from said client computer, said plurality of control panel information; and
   iv) is synchronized with said plurality of control panel information.

6. The system of claim 1, wherein said account comprises a user account for a social networking service comprising any combination of:
   i) one or more social networking software applications; and
   ii) one or more widgets, each of said one or more widgets comprising a portable software code incorporated into one or more web pages without recompiling said portable software code.

7. The system of claim 1, wherein said website content is further published on a registrar web page for a registrar of said one of said one or more domain names.

8. The system of claim 1, wherein said website comprises a parked web page, said parked web page comprising a single web page configured to:
   i) resolve from said one of said one or more domain names;
   ii) display one or more advertising listings and links;
   iii) pay said registrant of said one of said one or more domain names based on how many of said one or more advertising listings and links have been visited or clicked;

iv) reserve said one of said one or more domain names for future development without associating said one of said one or more domain names with a hosted website or one or more email services; and v) display information that said hosted website is not yet completed.

9. The system of claim 1, wherein said announcement module is further configured to transmit to said client computer, for display on a control panel, one or more products recommended to increase, via said hyperlink, a monitored metric for traffic to said website.

10. A system, comprising one or more server computers communicatively coupled to a network and running:

A) one or more domain name registration modules configured to register one or more domain names; and B) one or more announcement modules configured to:
 i) generate a website content for a search engine feed result comprising:
  a) an announcement of a registration of one of said one or more domain names to a registrant; and
  b) a hyperlink to a website resolving from said one of said one or more domain names;
 ii) receive from said registrant, via a client computer communicatively coupled to a network:
  a) one or more authentication credentials for accessing an account for said registrant on a social networking website; and
  b) a delay period after which to make said website content for said search engine feed result available to one or more users via a web page for said account for said registrant on said social networking website; and
 iii) responsive to an expiration of said delay period:
  a) authenticate to, with said one or more authentication credentials, via a social networking application programming interface, said account for said registrant on said social networking website; and
  b) make said website content for said search engine feed result available, via said social networking application programming interface, to said social networking website.

11. The system of claim 10, wherein said announcement module is further configured to detect:
 i) a plurality of general website traffic to said website;
 ii) a plurality of website traffic generated by said hyperlink;
 iii) a plurality of pay per click or click through traffic generated by one or more server redirects from said hyperlink; and
 iv) one or more changes to an amount of web pages in said website.

12. The system of claim 11, wherein said announcement module is further configured to:
 i) responsive to a detected change to said amount of web pages in said website, automatically publish on said web page, during said delay period and via said social networking application programming interface, one or more announcements of one or more website updates or developments; and
 ii) responsive to a detected increase in said website traffic generated by said hyperlink, automatically make said website content for said search engine feed result available, via said social networking application programming interface, to said social networking website.

13. The system of claim 10, wherein said one or more server computers are configured to receive a plurality of control panel information from a control panel on said client computer, said plurality of control panel information being used by said one or more servers to:
 i) manage said one or more domain names and one or more hosted websites;
 ii) grant permission to publish said website content;
 iii) access and configure said social networking application programming interface;
 iv) identify a selection by said registrant to:
  a) immediately generate traffic for a parked web page via said hyperlink; and
  b) immediately publish one or more website content files for said website and an announcement of a finished hosted website;
 v) identify a preference by said registrant to receive an electronic notice of said expiration of said delay period;
 vi) a preference by said registrant to receive notice, prior to said website content being published, that said website content will be published; and
 vii) receive notice that said registrant will publish one or more announcements of one or more updates or one or more new developments to said website during said delay period.

14. The system of claim 13, wherein said social networking application programming interface:
 i) comprises a software interface provided by said social networking website to support function calls or requests for services made of said social networking website by one or more computer programs on said one or more server computers or said client computer;
 ii) is accessed via said one or more authentication credentials;
 iii) receives, from said client computer, said plurality of control panel information; and
 iv) is synchronized with said plurality of control panel information.

15. The system of claim 10, wherein said account comprises a user account for a social networking service comprising any combination of:
 i) one or more social networking software applications; and
 ii) one or more widgets, each of said one or more widgets comprising a portable software code incorporated into one or more web pages without recompiling said portable software code.

16. The system of claim 10, wherein said website content is further published on a registrar web page for a registrar of said one of said one or more domain names.

17. The system of claim 10, wherein said website comprises a parked web page, said parked web page comprising a single web page configured to:
 i) resolve from said one of said one or more domain names;
 ii) display one or more advertising listings and links;
 iii) pay said registrant of said one of said one or more domain names based on how many of said one or more advertising listings and links have been visited or clicked;
 iv) reserve said one of said one or more domain names for future development without associating said one of said one or more domain names with a hosted website or one or more email services; and
 v) display information that said hosted website is not yet completed.

18. The system of claim 10, wherein said announcement module is further configured to transmit to said client computer, for display on a control panel, one or more products recommended to increase, via said hyperlink, a monitored metric for traffic to said website.

* * * * *